US009203815B1

(12) United States Patent
Bogorad et al.

(10) Patent No.: US 9,203,815 B1
(45) Date of Patent: Dec. 1, 2015

(54) SYSTEMS AND METHODS FOR SECURE THIRD-PARTY DATA STORAGE

(71) Applicant: Symantec Corporation, Mountain View, CA (US)

(72) Inventors: Walter Bogorad, Danville, CA (US); Eric Douglas, Los Gatos, CA (US)

(73) Assignee: Symantec Corporation, Mountain View, CA (US)

( * ) Notice: Subject to any disclaimer, the term of this patent is extended or adjusted under 35 U.S.C. 154(b) by 37 days.

(21) Appl. No.: 14/092,757

(22) Filed: Nov. 27, 2013

(51) Int. Cl.
*H04L 29/06* (2006.01)
*H04L 9/00* (2006.01)
*H04L 9/08* (2006.01)

(52) U.S. Cl.
CPC .................................. *H04L 63/0442* (2013.01)

(58) Field of Classification Search
CPC .................................................. H04L 63/0442
See application file for complete search history.

(56) References Cited

U.S. PATENT DOCUMENTS

| 8,458,494 | B1 | 6/2013 | Bogorad | |
| 8,484,716 | B1 * | 7/2013 | Hodgson et al. | 726/11 |
| 8,539,567 | B1 * | 9/2013 | Logue et al. | 726/7 |
| 2013/0111217 | A1 * | 5/2013 | Kopasz et al. | 713/189 |
| 2014/0189808 | A1 * | 7/2014 | Mahaffey et al. | 726/4 |

OTHER PUBLICATIONS

Dewan, Synchronous vs Asynchronous, 2006, University of North Carolina at Chapel Hill Department of Computer Science, COMP 242 Class Notes, Section 3: Interprocess Communication.*
Steve Chazin, et al; Systems and Methods for Sharing Data Stored on Secure Third-Party Storage Platforms; U.S. Appl. No. 13/952,487, filed Jul. 26, 2013.

* cited by examiner

*Primary Examiner* — Tae Kim
*Assistant Examiner* — Louis Teng
(74) *Attorney, Agent, or Firm* — ALG Intellectual Property, LLC

(57) ABSTRACT

A computer-implemented method for secure third-party data storage may include (1) identifying, at a server-side computing system, a data access request from a client system to access an encrypted file stored under a user account, (2) receiving a long poll request from the client system, (3) identifying an asymmetric key pair designated for the user account, the asymmetric key pair including an encryption key and a decryption key that has been encrypted with a client-side key, (4) responding to the long poll request with a message notifying the client system to transmit the client-side key, (5) receiving, from the client system, the client-side key, (6) decrypting the decryption key with the client-side key, and (7) using the decryption key to access an unencrypted version of the encrypted file. Various other methods, systems, and computer-readable media are also disclosed.

20 Claims, 7 Drawing Sheets

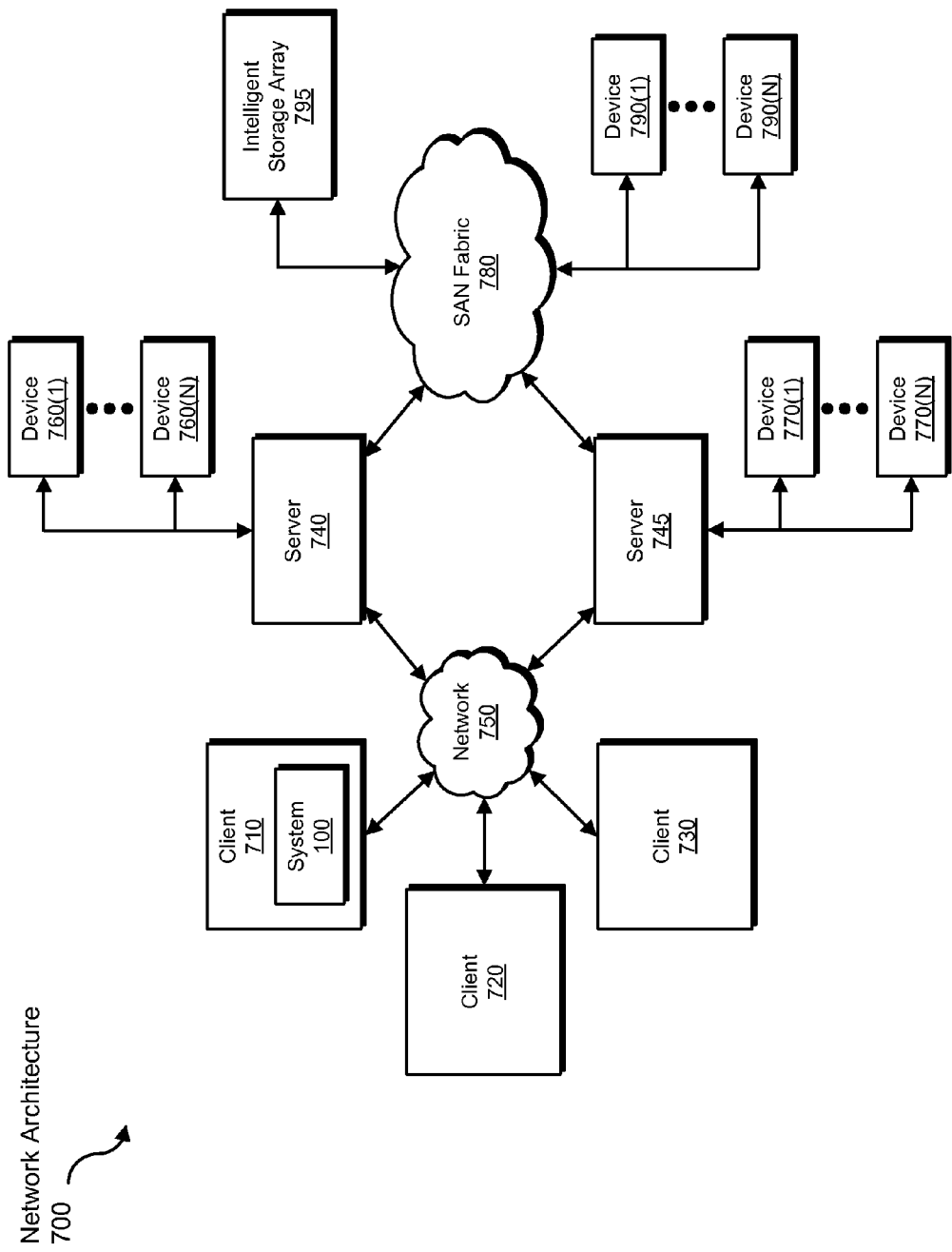

SYSTEMS AND METHODS FOR SECURE THIRD-PARTY DATA STORAGE

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical files using different encryption schemes (e.g., different keys), the resulting encrypted files will differ, potentially preventing the third-party storage vendor from deduplicating the files into a single file that is referenced multiple times. Additionally, encrypting files before submitting the files to a third-party storage system may interfere with the ability of a third-party storage service to efficiently share the files with other users where directed.

Accordingly, the instant disclosure identifies and addresses a need for additional and improved systems and methods for secure third-party data storage.

SUMMARY

As will be described in greater detail below, the instant disclosure generally relates to systems and methods for secure third-party data storage by maintaining asymmetric key pairs for encrypting and decrypting secured data (e.g., files and/or encryption keys for files) on a third-party storage server and encrypting the decryption keys of these asymmetric key pairs with encryption keys maintained by clients. These systems and methods may facilitate client-side security by using client-initiated long poll connections to allow a third-party storage service to initiate requests the client-maintained encryption keys.

In one example, a computer-implemented method for secure third-party data storage may include (1) identifying, at a server-side computing system, a data access request from a client system to access an encrypted file stored under a user account, where the requested access requires decryption of the encrypted file, (2) receiving a long poll request from the client system, (3) identifying, in reaction to the data access request, an asymmetric key pair designated for the user account, the asymmetric key pair including an encryption key and a decryption key that has been encrypted with a client-side key, (4) responding to the long poll request, in reaction to the data access request, with a message notifying the client system to transmit the client-side key, (5) receiving, from the client system, the client-side key, (6) decrypting the decryption key with the client-side key, and (7) using the decryption key to access an unencrypted version of the encrypted file.

In some examples, the computer-implemented method may further include receiving a prior long poll request from the client system that times out before receiving the long poll request from the client system, where the client system sends the long poll request in response to determining that the prior long poll request has timed out.

In one embodiment, (1) receiving the long poll request from the client system may include receiving the long poll request at an intermediate application tier that is configured to receive the client-side key from the client system and to provide the client-side key to a data-serving application tier that accesses the unencrypted version of the encrypted file, and (2) decrypting the decryption key with the client-side key may include decrypting the decryption key at the data-server application tier.

In some examples, identifying the data access request may include receiving the data access request at the data-serving application tier. In one embodiment, the data-serving application tier, in response to receiving the data access request, may perform a synchronous call to the intermediate application tier that requests the client-side key.

In one embodiment, the intermediate application tier, upon receiving a synchronous call from the data-serving application tier that requests the client-side key, may check for an active long poll connection established by the long poll request. In one embodiment, (1) the intermediate application tier, upon receiving a synchronous call from the data-serving application tier that requests the client-side key, may determine that no active long poll connection for requesting the client-side key is available, and (2) in response to determining that no active long poll connection for requesting the client-side key is available, the intermediate application tier may place the synchronous call in a request queue until an active long poll connection is established via the long poll request.

In one embodiment, (1) a first server within the intermediate application tier may receive a synchronous call from the data-serving application tier requesting the client-side key, (2) a second server within the intermediate application tier may receive the client-side key from the client system, (3) the second server may place the client-side key in return queue, and (4) the first server may retrieve the client-side key from the return queue.

In one embodiment, (1) the intermediate application tier may receive an authentication token derived at least in part from user credential information used for access to the data-access application tier, and (2) the intermediate application tier may respond with the message notifying the client system to transmit the client-side key in response to determining that the authentication token is valid.

In one embodiment, a system for implementing the above-described method may include (1) an identification module that identifies, at a server-side computing system, a data access request from a client system to access an encrypted file stored under a user account, where the requested access requires decryption of the encrypted file, (2) a connection module that receives a long poll request from the client system, (3) a key module that identifies, in reaction to the data access request, an asymmetric key pair designated for the user account, the asymmetric key pair including an encryption key and a decryption key that has been encrypted with a client-side key, (4) a response module that responds to the long poll request, in reaction to the data access request, with a message notifying the client system to transmit the client-side key, (5) a receiving module that receives, from the client system, the client-side key, (6) a decryption module that decrypts the decryption key with the client-side key, (7) an access module that uses the decryption key to access an unencrypted version of the encrypted file, and (8) at least one processor configured to execute the identification module, the connection module, the key module, the response module, the receiving module, the decryption module, and the access module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify, at a server-side computing system, a data access request from a client system to access an encrypted file stored under a user account, where the requested access requires decryption of the encrypted file, (2) receive a long poll request from the client system, (3) identify, in reaction to the data access request, an asymmetric key pair designated for the user account, the asymmetric key pair including an encryption key and a decryption key that has been encrypted with a client-side key, (4) respond to the long poll request, in reaction to the data access request, with a message notifying the client system to transmit the client-side key, (5) receive, from the client system, the client-side key, (6) decrypt the decryption key with the client-side key, and (7) use the decryption key to access an unencrypted version of the encrypted file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a block diagram of an exemplary computing network capable of implementing one or more of the embodiments described and/or illustrated herein.

Figure 1:
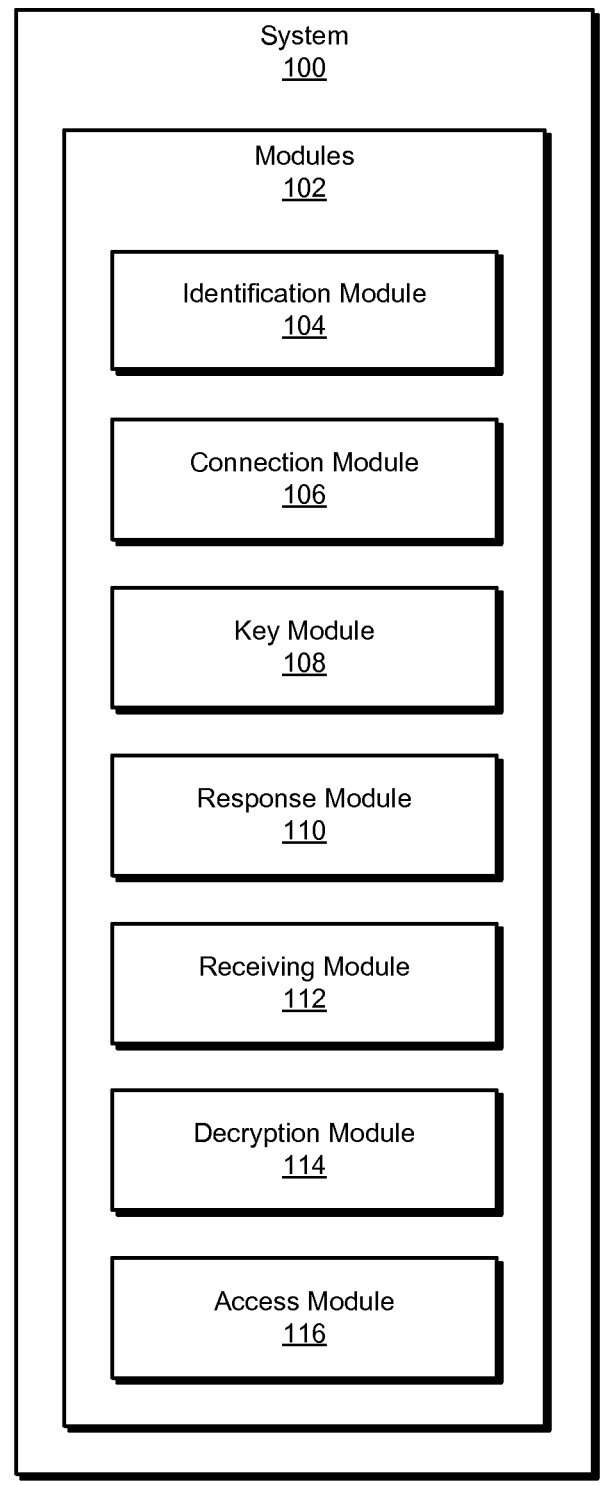
FIG. 1 is a block diagram of an exemplary system for secure third-party data storage.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for secure third-party data storage. As will be explained in greater detail below, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may securely store and encrypt client data without storing the client-side decryption keys required to access the secured data in an unencrypted state. Furthermore, by using client-initiated long poll connections to allow a third-party storage service to initiate requests for the client-maintained encryption keys, these systems and methods may improve client-side security (e.g., by enabling the third-party storage service to initiate requests without requiring that a client-side device maintain an open port that could potentially weaken a firewall and increase client exposure to outside threats). Additionally, in some examples these systems and methods may authenticate requests to retrieve client-side encryption keys to avoid unauthorized access to client-side encryption keys.

The following will provide, with reference to FIGS. 1, 2, 4, and 5, detailed descriptions of exemplary systems for secure third-party data storage. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for secure third-party data storage. As illustrated in this figure, exemplary system 100 may include one or more modules 102 for performing one or more tasks. For example, and as will be explained in greater detail below, exemplary system 100 may also include an identification module 104 that may identify, at a server-side computing system, a data access request from a client system to access an encrypted file stored under a user account, where the requested access requires decryption of the encrypted file. Exemplary system 100 may additionally include a connection module 106 that may receive a long poll request from the client system. Exemplary system 100 may also include a key module 108 that may identify, in reaction to the data access request, an asymmetric key pair designated for the user account, the asymmetric key pair including an encryption key and a decryption key that has been encrypted with a client-side key. Exemplary system 100 may additionally include a response module 110 that may respond to the long poll request, in reaction to the data access request, with a message notifying the client system to transmit the client-side key. Exemplary system 100 may also include a receiving module 112 that may receive, from the client system, the client-side key. Exemplary system 100 may additionally include a decryption module 114 that may decrypt the decryption key with the client-side key. Exemplary system 100 may also include an access module 116 that may use the decryption key to access an unencrypted version of the encrypted file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
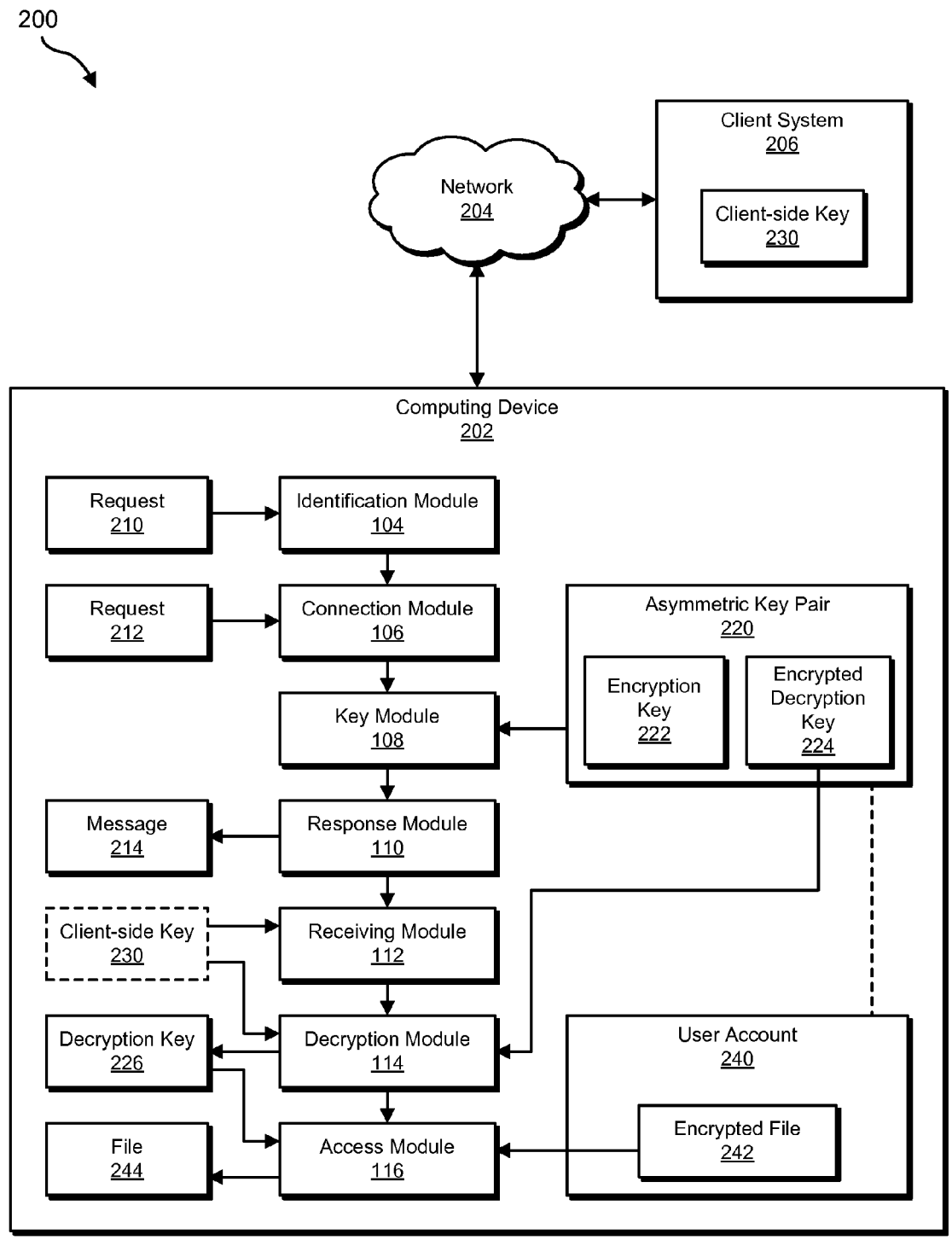
FIG. 2 is a block diagram of an exemplary system for secure third-party data storage.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 via a network 204. Computing device 202 may be programmed with one or more of modules 102. Additionally or alternatively, client system 206 may be programmed with one or more of modules 102.

In one embodiment, one or more of modules 102 from FIG. 1 may, when executed by at least one processor of computing device 202 and/or client system 206, facilitate computing device 202 and/or client system 206 in secure third-party data storage. For example, and as will be described in greater detail below, one or more of modules 102 may cause computing device 202 and/or client system 206 to facilitate secure third-party data storage. For example, and as will be described in greater detail below, identification module 104 may be programmed to identify, at server-side computing device 202, a data access request 210 from client system 206 to access an encrypted file 242 stored under a user account 240, where the requested access requires decryption of encrypted file 242. Connection module 106 may be programmed to receive a long poll request 212 from client system 206. Key module 108 may be programmed to identify, in reaction to data access request 210, an asymmetric key pair 220 designated for user account 240, asymmetric key pair 220 including an encryption key 222 and an encrypted decryption key 224 that has been encrypted with a client-side key 230. Response module 110 may be programmed to respond to long poll request 212, in reaction to data access request 210, with a message 214 notifying client system 206 to transmit client-side key 230. Receiving module 112 may be programmed to receive, from client system 206, client-side key 230. Decryption module 114 may be programmed to decrypt encrypted decryption key 224 with client-side key 230. Access module 116 may be programmed to use decryption key 224 to access an unencrypted version of encrypted file 242 (e.g., a file 244).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, computing device 202 may represent a group of servers that facilitate secure data storage, access to stored data, and/or encryption key retrieval.

Client system 206 generally represents any type or form of computing device capable of reading computer-executable instructions. Examples of client system 206 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device. In some examples, client system 206 may represent an enterprise network that includes multiple computing devices that access third-party storage services and/or store encryption keys for secure third-party storage services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and computing system 206.

Figure 3:
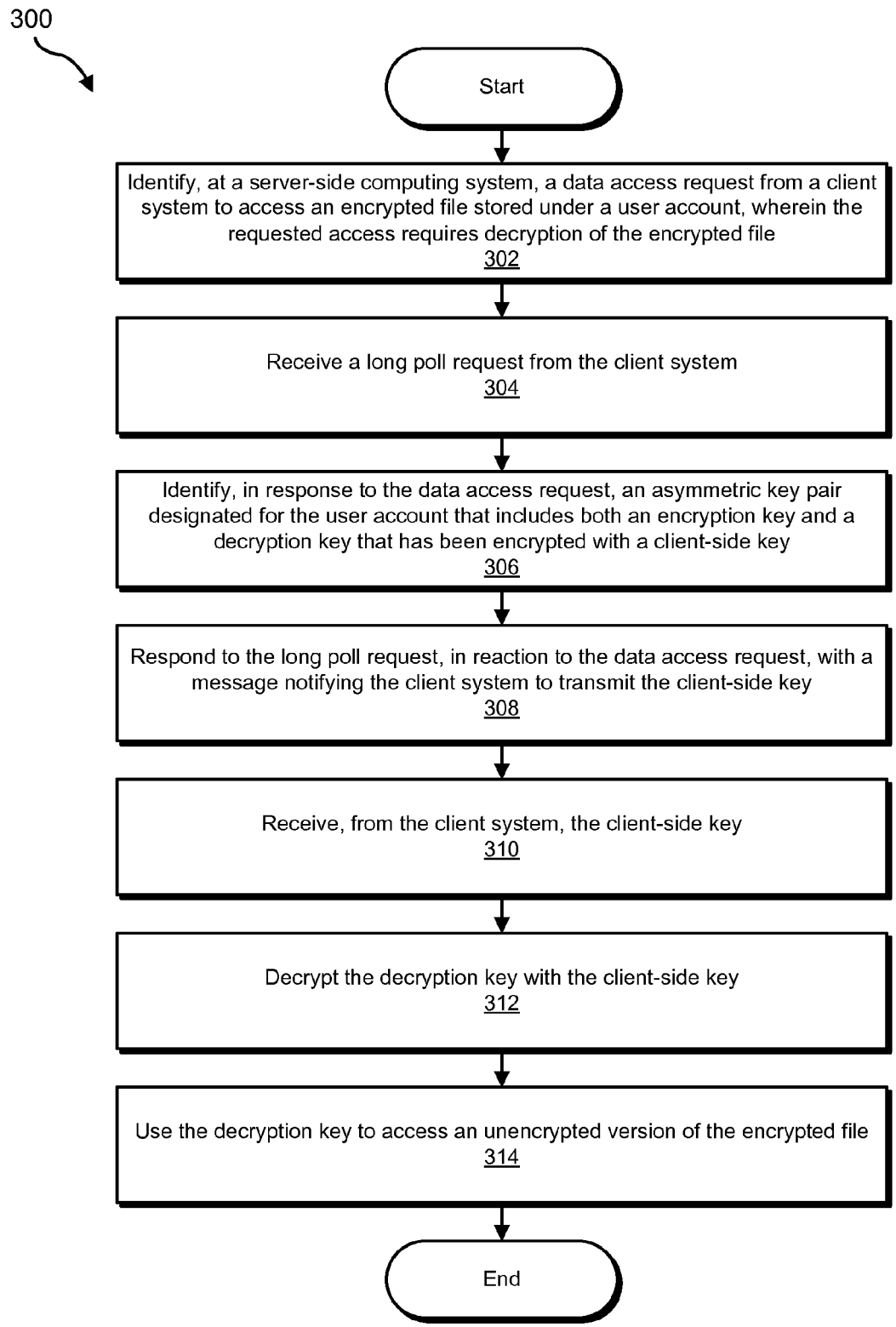
FIG. 3 is a flow diagram of an exemplary method for secure third-party data storage.

FIG. 3 is a flow diagram of an exemplary computer-implemented method 300 for secure third-party data storage. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify, at a server-side computing system, a data access request from a client system to access an encrypted file stored under a user account, where the requested access requires decryption of the encrypted file. For example, at step 302 identification module 104 may, as part of computing device 202 in FIG. 2, identify, at server-side computing device 202, data access request 210 from client system 206 to access encrypted file 242 stored under user account 240, where the requested access requires decryption of encrypted file 242.

In some examples, the server-side computing system may operate as part of a third-party storage system. As used herein, the term "third-party storage system" may refer to any type or form of storage system, including a cloud-based storage system, that is capable of storing data on behalf of a user. In some examples, the third-party storage system may store data for multiple distinct entities. In at least one example, the entities that store data with the third-party storage system may require data security against each other (in order to, e.g., prevent unprivileged access of data across entities), against intruders (e.g., entities not authorized to access data stored within the third-party storage system), and/or one or more administrators of the third-party storage system. In some examples, the third-party storage system may represent or include a single-instance storage system (i.e., a storage system configured to only store a single instance of each item of content for multiple owners).

Accordingly, the client system may, in turn, include any system for facilitating the use of a third-party storage system. In some examples, the client system may be owned and/or administrated by an entity distinct from an owner and/or administrator of the server-side computing device.

As used herein, the term "file" may refer to any suitable unit of data, including, without limitation, a file, data object, data segment, portion of a data stream, database, database entry, and/or electronic document. In addition, the phrase "user account" may refer to any identifier and/or privilege system that may correspond to a data owner (used, e.g., to identify data owned by the data owner and/or to secure data owned by the data owner for use by the data owner).

Identification module 104 may identify any of a variety of types of data access requests. For example, as will be explained in greater detail below, identification module 104 may identify a request to retrieve an unencrypted version of the encrypted file for the client system. Additionally or alternatively, identification module 104 may identify a request to share an accessible version of the file with another user account. In some examples, identification module 104 may identify a request to perform one or more procedures on the file (e.g., procedures that require access to an unencrypted version of the encrypted file).

Identification module 104 may receive the data access request in any of a variety of contexts. For example, identification module 104 may receive a user-initiated data access request from the client system. In some examples, one or more of the modules described herein may operate in different tiers of a multi-tier application for secure third-party data storage. For example, identification module 104 may operate as a part of a client-facing tier (e.g., that provides an interface for clients and/or users of the third-party data storage to access stored data) and/or a data-server tier that processes requests to access stored data.

In some examples, the client system may include only a single computing device, and identification module 104 may receive the data access request from the same computing device that stores a decryption key needed to fulfill the data access request. Alternatively, as will be explained in greater detail below, the client system may include multiple computing devices, and identification module 104 may receive the data access request from a computing device that is distinct from another computing device within the client system that stores a decryption key needed to fulfill the data access request.

Figure 4:
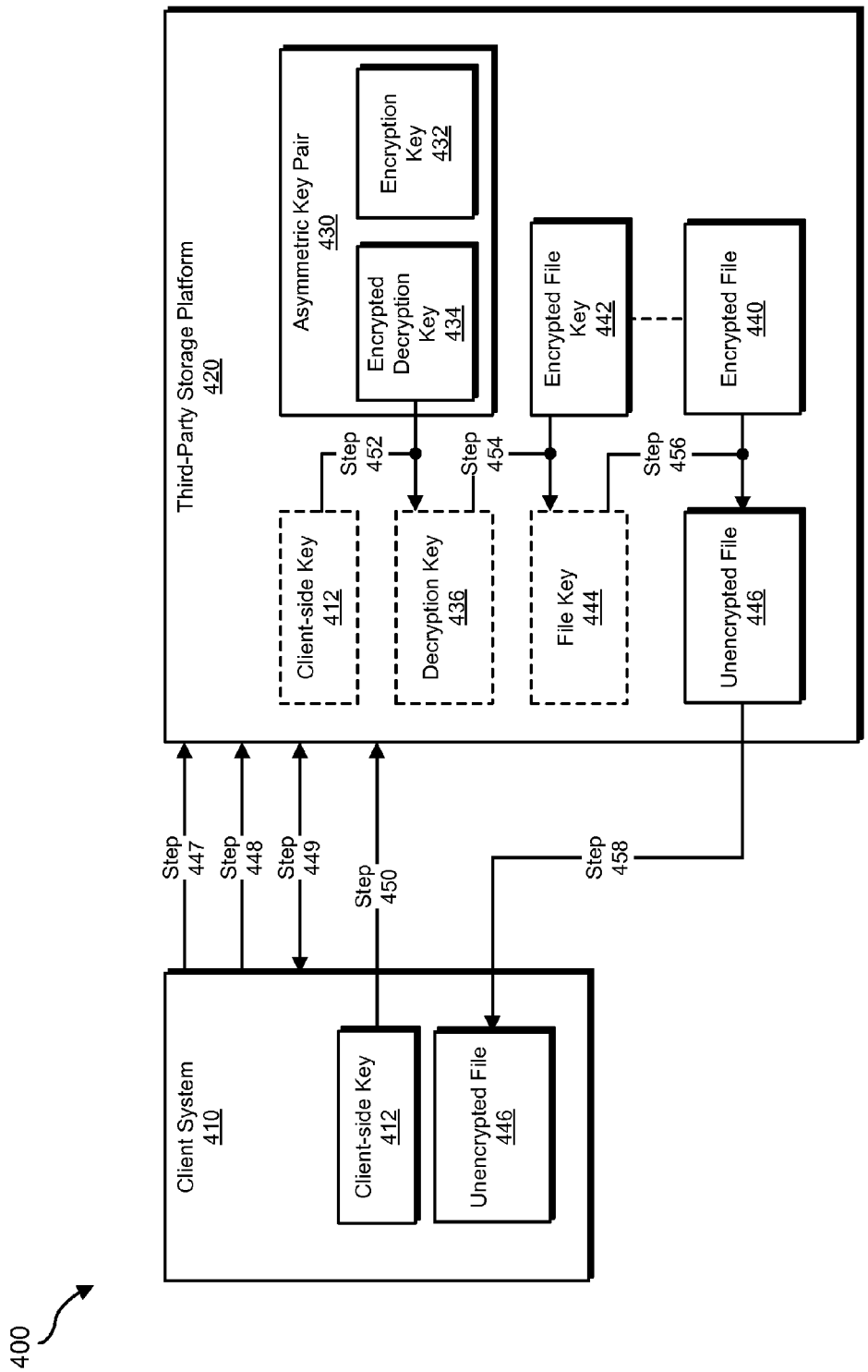
FIG. 4 is a block diagram of an exemplary system for secure third-party data storage.

As an example, FIG. 4 provides an illustration of an exemplary system 400 that includes a simple client system 410 that stores a client-side key 412 needed to access encrypted data stored on third-party storage platform 420 and that also requests access to an unencrypted version of the encrypted data from third-party storage platform 420.

As mentioned earlier, in some examples one or more of the modules described herein may operate in different tiers of a multi-tier application for secure third-party data storage. In some examples, identification module 104 may, as a part of a data-serving application tier and in response to receiving the data access request, perform a synchronous call to an intermediate application tier that requests the client-side key.

Returning to FIG. 3, at step 304 one or more of the systems described herein may receive a long poll request from the client system. For example, at step 304 connection module 106 may, as part of computing device 202 in FIG. 2, receive long poll request 212 from client system 206.

As used herein, the phrase "long-poll request" may refer to any type of request that establishes a channel of communication from an originating device to a target device and that enables the target device to communicate with the originating device at the initiative of the target device. Accordingly, a long-poll request may invert the typical request-response relationship of a client and server by enabling a server to initiate substantive communication to a client via a connection established by the client. In some examples, a long-poll request may allow a client to receive communication from a server through a port that is used for typical request-response communication (e.g., port 80 for Hypertext Transfer Protocol communications) instead of receiving communication through a separate (and, e.g., application-specific) port for receiving inbound communication. By enabling a client to receive substantive inbound communications through an outbound connection established by the client, the systems described herein may reduce the attack surface of the client and/or reduce the complexity of security rules needed to protect the client.

In some examples, the long-poll request may have a set timeout value, after which a connection established by the long-poll request may be lost. In these examples, a client may immediately send a new long-poll request to reestablish a long poll connection. For example, connection module 106 may have received a prior long poll request from the client system that timed out before connection module 106 received the long poll request from the client system. In this example, the client system may have sent the long poll request in response to determining that the prior long poll request timed out.

As mentioned earlier, in some examples one or more of the modules described herein may operate in different tiers of a multi-tier application for secure third-party data storage. For example, connection module 106 may operate as a part of an intermediate application tier that is configured to receive the client-side key from the client system and to provide the client-side key to a data-server application tier that accesses the unencrypted version of the encrypted file.

Returning to FIG. 3, at step 306 one or more of the systems described herein may identify, in reaction to the data access request, an asymmetric key pair designated for the user account, the asymmetric key pair including an encryption key and a decryption key that has been encrypted with a client-side key. For example, at step 306 key module 108 may, as part of computing device 202 in FIG. 2, identify, in reaction to data access request 210, asymmetric key pair 220 designated for user account 240, asymmetric key pair 220 including encryption key 222 and encrypted decryption key 224 that has been encrypted with client-side key 230.

As used herein, the phrase "asymmetric key pair" may refer to any pair of cryptographic keys that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In some examples, the asymmetric key pair may be stored on and/or by a third-party storage system. In at least one example, neither the encryption key nor the decryption key may be distributed outside the third-party storage system.

In addition, the phrase "client-side key," as used herein, may refer to any suitable cryptographic key or keys for encrypting and/or decrypting the decryption key of the asymmetric key pair. In some examples, the client-side key may include a symmetric key (e.g., a key usable for both encrypting data and decrypting said data). For example, the client-side key may be configured to encrypt and decrypt data according to an Advanced Encryption Standard specification (e.g., AES-256). In some examples, the client-side key may be generated on the client system. For example, the client-side key may be generated using a key derivation function, such as a password-based key derivation function (e.g., PBKDF2).

In some examples, the client-side key may be cached on the client system. Additionally or alternatively, the client-side key may be generated as needed from a password (e.g., generated either at the client system or at a third-party storage system). In some examples, the client-side key may be retrieved from an external key store. As will be explained in greater detail below, in some examples the client-side key may not be stored on the server-side computing device and/or within a third-party storage system implemented by the server-side computing device. In some examples, the client-side key may be accessible only by a corresponding client.

This client may correspond to an organization, a group with shared secrets, a computing device, and/or any other suitable entity.

In some examples, one or more of the systems described herein may have used the encryption key within the asymmetric key pair to encrypt the encrypted file. For example, one or more of the systems described herein may receive the unencrypted version of the encrypted file from the client system and then generate the encrypted file. These systems may generate the encrypted file by generating a file key based on at least one characteristic of the unencrypted version of the encrypted file and then encrypting the unencrypted version of the encrypted file with the file key. For example, these systems may derive a hash of the unencrypted version of the encrypted file and base the file key on the hash. In this manner, the systems and methods described herein may produce identical encrypted files from identical unencrypted files, allowing for deduplication across clients.

For example, the systems described herein may deduplicate the encrypted file with an additional encrypted file that is encrypted with the file key. Upon generating the file key, these systems may encrypt the file key with the encryption key. The term "deduplication," as used herein, may refer to one or more operations related to reducing the amount of storage space used in a single-instance data storage system, including operations for detecting and preventing data from being redundantly stored to the single-instance data storage system. Deduplication may be performed using any suitable deduplication technology or algorithm. In some examples, deduplication may include file-level deduplication. Additionally or alternatively, deduplication may include block-level deduplication.

In addition to encrypting the unencrypted version of the encrypted file, in some examples one or more of the systems described herein may perform one or more operations based on the unencrypted version of the encrypted file (e.g., before encrypting the unencrypted version of the encrypted file and thereby losing access to the unencrypted version of the encrypted file). For example, one or more of the systems described herein may index the contents of the unencrypted version of the encrypted file, perform an anti-malware scan on the unencrypted version of the encrypted file, generate a preview of the contents of the unencrypted version of the encrypted file, etc. In these examples, these systems may associate metadata generated from the unencrypted version of the encrypted file with the encrypted file once the encrypted file is encrypted.

Key module 108 may identify the asymmetric key pair designated for the user account in any suitable manner. In some examples, a third-party storage system may host data for multiple user accounts, each with a designated and distinct asymmetric key pair. Accordingly, key module 108 may identify the asymmetric key pair for the user account according to one or more identifiers and/or credentials provided by the client system.

Returning to FIG. 3, at step 308 one or more of the systems described herein may respond to the long poll request, in reaction to the data access request, with a message notifying the client system to transmit the client-side key. For example, at step 308 response module 110 may, as part of computing device 202 in FIG. 2, respond to long poll request 212, in reaction to data access request 210, with message 214 notifying client system 206 to transmit client-side key 230.

For example, response module 110 may respond to the long poll request with any suitable message. For example, response module 110 may respond to the long poll request with an identifier of a user account that corresponds to the client-side key. Additionally or alternatively, response module 110 may respond to the long poll request with a command that designated as a command to send the client-side key. In some examples, the message may include an authentication token that the client system can validate to ensure that the request for the client-side key is legitimate.

As mentioned earlier, in some examples one or more of the modules described herein may operate in different tiers of a multi-tier application for secure third-party data storage. For example, response module 110 may operate as a part of an intermediate application tier. In this example, response module 110, at the intermediate application tier, receive a synchronous call from a data-serving application tier that requests the client-side key. In some examples, response module 110 may then place information relating to the synchronous call (e.g., an identifier of a user account that corresponds to the requested client-side key) in a request queue. In these examples, response module 110 may later retrieve the information relating to the synchronous call from the request queue and use the information to create and send the message notifying the client system to transmit the client-side key. Additionally or alternatively, response module 110 may first check for an available and active long poll connection for requesting the client-side key. In this example, response module 110 may place the information relating the synchronous call in the request queue only after failing to find an available and active long poll connection for requesting the client-side key (or, alternatively, may send the message via an active long poll connection for requesting the client-side key if one is available).

As mentioned above, in some examples response module 110 may receive (e.g., as a part of an intermediate application tier) a synchronous call and/or may retrieve information relating to a synchronous call to request the client-side key from the client system. In some examples, response module 110 may, as a part of the intermediate application tier, receive an authentication token (e.g., via the synchronous call) to validate the synchronous call. For example, the authentication token may be derived at least in part from user credential information used for access to the data-access application tier. Response module 110 may then, as a part of the intermediate application tier, determine that the authentication token is valid and proceed to respond to the client system with the message notifying the client system to transmit the client-side key. The authentication token may be derived in any suitable fashion. For example, the authentication token may have been generated during a user login using user account credentials for a third-party storage service. In this example, these credentials may not be stored in non-volatile memory at the third-party storage service, but rather forwarded to the intermediate application tier to validate as a part of the process of requesting the client-side key. In some examples, response module 110 may receive a two-factor authentication token value tied to a user account for which the client-side key is requested (or a value derived from a two-factor authentication token value) and include the token value in the message to the client system. In this example, the client system may validate the authentication token value to validate the request from the intermediate application tier.

Returning to FIG. 3, at step 310 one or more of the systems described herein may receive, from the client system, the client-side key. For example, at step 310 receiving module 112 may, as part of computing device 202 in FIG. 2, receive, from client system 206, client-side key 230.

As mentioned earlier, in some examples the client-side key may not be stored on the server side (i.e., on the server-side computing device and/or an associated third-party storage system). For example, receiving module 108 may receive the client-side key and store the client-side key in volatile memory without storing the client-side key in non-volatile memory. As used herein, the phrase "volatile memory" may refer to any non-persistent and/or temporary storage location. In some examples, the phrase "volatile memory" may refer to random access memory. In addition, the phrase "non-volatile memory" may refer to any persistent storage location. For example, the phrase "non-volatile memory" may refer to a storage device used by a file system to store one or more files. In some examples, receiving module 112 may receive the client-side key and not preserve the client-side key after use. For example, receiving module 112 may discard the client-side key after a session with the client system has terminated.

Receiving module 112 may receive the client-side key from the client system in any of a variety of ways. For example, receiving module 112 may receive the client-side key from the client system directly. Additionally or alternatively, receiving module 112 may receive the client-side key from the client system by receiving data representing the client-side key and from which the client-side key may be generated. For example, receiving module 112 may receive a password for a key derivation function from the client system and use this key derivation function to generate the client-side key from the password. In this example, receiving module 108 may also keep the password only in non-volatile memory and/or discard the password upon using the password to generate the client-side key.

At step 312 one or more of the systems described herein may decrypt the decryption key with the client-side key. For example, at step 312 decryption module 114 may, as part of computing device 202 in FIG. 2, decrypt encrypted decryption key 224 with client-side key 230.

Decryption module 114 may decrypt the decryption key in any suitable manner. For example, decryption module 114 may apply the client-side key to the decryption key according to a predetermined symmetric key algorithm to generate a decrypted version of the decryption key.

As mentioned earlier, in some examples one or more of the modules described herein may operate in different tiers of a multi-tier application for secure third-party data storage. For example, decryption module 114 may operate as a part of a data-server application tier that accesses the unencrypted version of the encrypted file. Accordingly, decryption module 114 may decrypt the decryption key at the data-server application tier.

At step 314 one or more of the systems described herein may use the decryption key to access an unencrypted version of the encrypted file. For example, at step 314 access module 116 may, as part of computing device 202 in FIG. 2, use decryption key 224 to access an unencrypted version of encrypted file 242 (e.g., file 244).

Access module 116 may use the decryption key to access the unencrypted version of the encrypted file in any of a variety of ways. For example, access module 116 may identify a file key used to encrypt the encrypted file. In this example, the file key may be encrypted with the encryption key. Accordingly, access module 116 may decrypt the file key with the decryption key and then decrypt the encrypted file with the file key.

Access module 116 may access the unencrypted version of the encrypted file to any of a variety of ends. For example, as detailed above, the request from the client system may include a request to retrieve an unencrypted version of the encrypted file. Accordingly, access module 116 may transmit the unencrypted version of the encrypted file to the client system (e.g., in response to the request).

FIG. 4 illustrates an exemplary system 400 for secure third-party data storage. As shown in FIG. 4, exemplary system 400 may include a client system 410 configured to store one or more files via a third-party storage service facilitated by third-party storage server 420. For example, client system 410 may have previously transmitted an unencrypted file 446 to third-party storage server 420. Third-party storage server 420 may have identified an asymmetric key pair 430 associated with client system 410 and encrypted unencrypted file 446 using an encryption key 432. In one example, client system 410 may attempt to retrieve unencrypted file 446, now stored on third-party storage server 420 as encrypted file 440. For example, at step 447 client system 410 may send a long poll request to third-party storage platform 420 to open a long poll connection with third-party storage platform 420. At step 448, client system 410 may transmit a message to third-party storage platform 420 requesting unencrypted file 446. At step 449, third-party storage platform may respond to the long poll request with a message requesting client-side key 412 and client system 410 may provide client-side key 412 to third-party storage platform 420. Third-party storage server 420 may accordingly receive client-side key 412 and maintain client-side key 412 in memory for use.

At step 452, third-party storage server 420 may identify asymmetric key pair 430 and use decrypt an encrypted decryption key 434 with client-side key 412 to result in decryption key 436. At step 454, third-party storage server 420 may use decryption key 436 to decrypt an encrypted file key 442 to obtain a file key 444 for encrypted file 440. At step 456, third-party storage server 420 may use file key 444 to decrypt encrypted file 440 and obtain unencrypted file 446. At step 458, third-party storage server 420 may transmit unencrypted file 446 to client system 410, fulfilling the request by client system 410. Third-party storage system 420 may additionally discard client-side key 412, decryption key 436, and file key 444, and delete unencrypted file 446.

In some examples, access module 116 may access the unencrypted version of the encrypted file to generate metadata describing the unencrypted version of the encrypted file. In some examples, access module 116 may then store the metadata in relation to the encrypted file so that the metadata describing the encrypted file remains available even after the unencrypted version of the encrypted file is no longer directly accessible on a third-party storage system.

For example, access module 116 may perform a security scan on the unencrypted version of the encrypted file (e.g., to determine whether the encrypted file includes any malware or poses any other security risk). In another example, access module 116 may index the unencrypted version of the encrypted file based on content within the unencrypted version of the encrypted file (e.g., to facilitate searching for the encrypted file based on its content without access to the unencrypted version of the encrypted file). In an additional example, access module 116 may generate a preview of the unencrypted version of the encrypted file based on content within the unencrypted version of the encrypted file (e.g., to facilitate browsing through encrypted files without access to the unencrypted versions of the encrypted files). As detailed above, in some examples one or more systems described herein may additionally or alternatively perform one or more of the operations described above when the unencrypted version of the encrypted file is first uploaded (e.g., before encryption).

In some examples, access module 116 may provide access to the unencrypted version of the encrypted file to another party. For example, access module 116 may provide access to the unencrypted version of the encrypted file to another user account. In this example, an additional asymmetric key pair may be designated for the additional user account, including an additional encryption key and an additional decryption key. The additional decryption key may be encrypted with an additional client-side key (pertaining, e.g., to an additional client system corresponding to the additional user account). In this example, access module 116 may provide access to the unencrypted version of the encrypted file to the additional user account by first identifying a file key used to encrypt the encrypted file. Since the encrypted file may pertain to the user account, the file key may be encrypted with the encryption key (i.e., the encryption key of the asymmetric key pair corresponding to the user account). Access module 116 may then decrypt the file key with the decryption key and encrypt a copy of the file key with the additional encryption key. In this manner, the additional user account may have access to the encrypted file (by, e.g., submitting the additional client-side key to decrypt the file key, allowing for decryption of the encrypted file by the file key).

In some examples, access module 116 may provide access to the unencrypted version of the encrypted file to the additional user account by allowing an additional client-side key corresponding to the additional user account to decrypt the decryption key of the user account. For example, access module 116 may identify an additional user account designated to access the unencrypted version of the encrypted file. In this example, an additional asymmetric key pair may be designated for the additional user account that includes both an additional encryption key and an additional decryption key. The additional decryption key may be encrypted with an additional client-side key (pertaining, e.g., to an additional client system corresponding to the additional user account).

In the above-described example, access module 116 may provide access to the unencrypted version of the encrypted file to the additional user account by encrypting the decryption key with the additional encryption key (and, e.g., storing the encrypted decryption key for later use with the additional user account). For example, one or more of the systems described herein may later identify an additional request from an additional client system to further access the encrypted file via the additional user account. These systems may then decrypt the decryption key with the additional decryption key and use the decryption key to access the unencrypted version of the encrypted file via the additional user account (by, e.g., using the decryption key to decrypt a file key with which the encrypted file has been encrypted and then decrypting the encrypted file with the file key). In some examples, the above-described approach may be used to share multiple files between the user account and the additional user account. This approach may also eliminate some cryptographic processing steps (by, e.g., not requiring the generation of a separate encrypted file key for each file shared).

In some examples access module 116 may provide access to the unencrypted version of the encrypted file based on a membership to a group of user accounts. For example, access module 116 may identify an additional asymmetric key pair designated for a group of user accounts that include the user account. The additional asymmetric key pair may include an additional encryption key and an additional decryption key. The additional decryption key may be encrypted with an encryption key that corresponds to the asymmetric key pair of the user account. Access module 116 may then decrypt the additional decryption key with the decryption key. Access module 116 may further identify a file key used to encrypt the encrypted file. The file key may be encrypted with the additional encryption key. Accordingly, access module 116 may decrypt the file key with the additional decryption key and decrypt the encrypted file with the file key. In an additional example, the encrypted file may be encrypted with the additional encryption key instead of a file key. In this example, access module 116 may simply decrypt the encrypted file with the additional decryption key.

Figure 5:
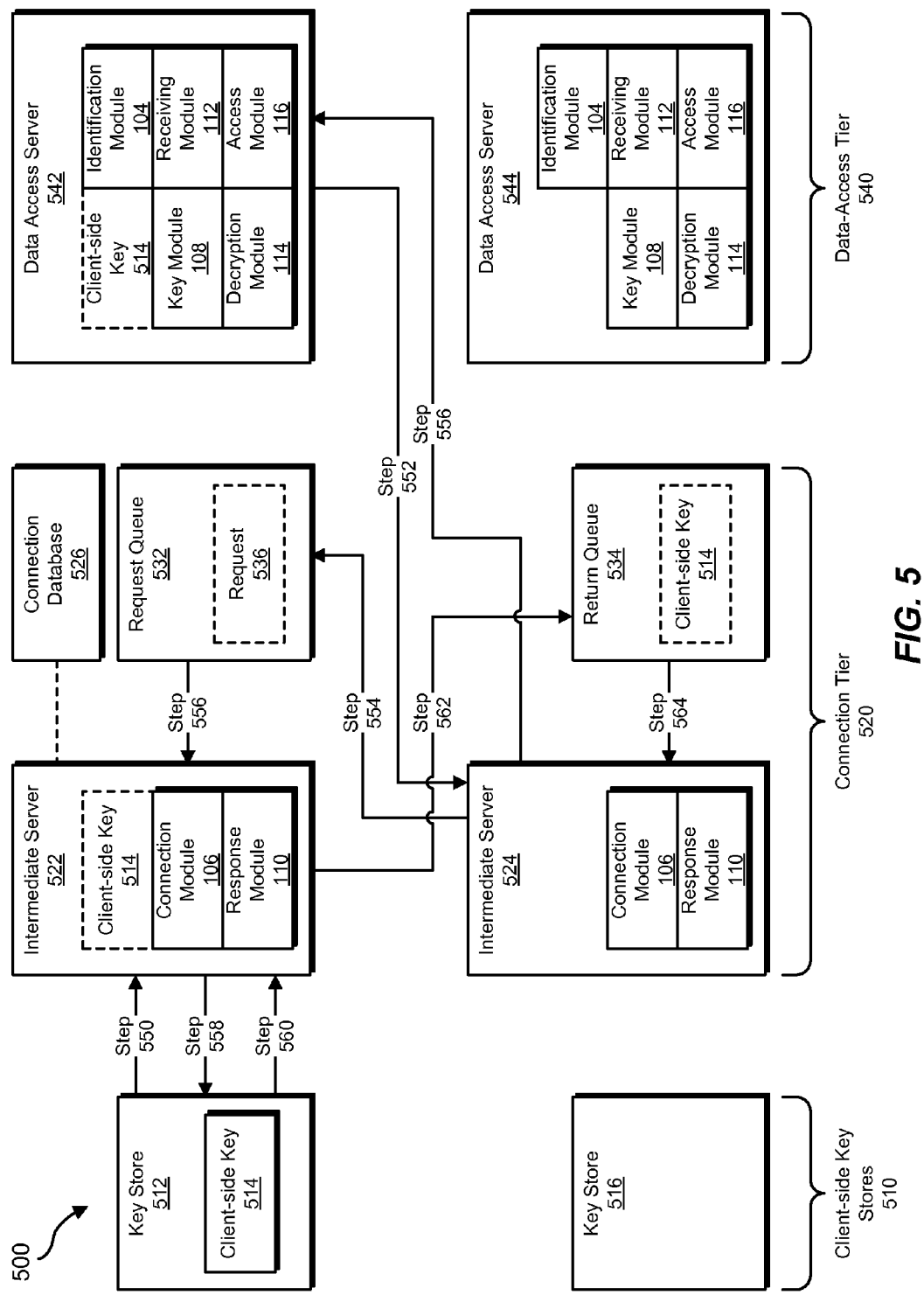
FIG. 5 is a block diagram of an exemplary system for secure third-party data storage.

For an example of multiple server-side tiers coordinating to retrieve and use the client-side key, FIG. 5 is a block diagram of an exemplary system 500 for secure third-party data storage. As shown in FIG. 5, exemplary system 500 may include client-side key stores 510 (including, e.g., a key store 512 with a client-side key 514 and a key store 516). Exemplary system 500 may also include a connection tier 520 that includes intermediate servers 522 and 524, a connection database 526, a request queue 532, and a return queue 534. Exemplary system 500 may also include a data-access tier 540 that includes data access servers 542 and 544.

In one example, at step 550, key store 512 may send a long-poll request to intermediate server 522 to initiate a long-poll connection. In some examples, connection module 106 may, as a part of intermediate server 522, may register this connection in connection database 526. A user who has an account with a third-party storage service and who controls access to client-side key 514 may subsequently initiate a data access request with the third-party storage service. Identification module 104 may, as a part of data access server 542, identify the data access request. At step 552, identification module 104 and/or receiving module 112 may then attempt to acquire client-side key 514 by issuing a call to a connection tier 520 (received by an intermediate server 524). At step 554, intermediate server 524 may place a request 536 for client-side key 514 in a request queue 532. At step 556, intermediate server 522 may retrieve request 536 from request queue 532 (e.g., because intermediate server 522 has a long poll connection established with key store 512 and request 536 is directed to key store 512). In one example, intermediate server 524 and/or intermediate server 522 may consult connection database 526 to determine that intermediate server 522 has a long poll connection with key store 512 and that request 536 therefore corresponds to intermediate server 522. At step 558, response module 110 may respond to the long poll request by forwarding request 536 to key store 512. At step 560, key store 512 may respond to request 536 by providing client-side key 514 to intermediate server 522. At step 562, intermediate server 522 may place client-side key 514 in a return queue 534. In some examples, intermediate server 522 may place client-side key 514 in return queue 534 (e.g., as opposed to a different return queue) based on request 536 having been placed in request queue 532 by intermediate server 524. At step 564, intermediate server 524 may retrieve client-side key 514. At step 566, intermediate server 524 may respond to the earlier call made by data access server 542 to intermediate server 524 with client-side key 514. Receiving module 112 may then, as a part of data access server 542, receive client-side key 514 from intermediate server 524. Decryption module 114 may then decrypt a decryption key using client-side key 514. Access module 116 may then access an unencrypted version of user-requested data by using the decrypted decryption key.

In some examples, intermediate server 522 and intermediate server 524 may operate in separate data centers. Additionally or alternatively, data access server 542 and data access server 544 may operate in separate data centers. In some examples, by configuring intermediate servers to use request queues and/or return queues instead of sending direct messages to each other, the systems described herein may improve scalability (e.g., adding many intermediate servers to the connection tier and/or adding many data access servers to the data-access tier).

As explained above, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may securely store and encrypt client data without storing the client-side decryption keys required to access the secured data in an unencrypted state. Furthermore, by using client-initiated long poll connections to allow a third-party storage service to initiate requests for the client-maintained encryption keys, these systems and methods may improve client-side security (e.g., by enabling the third-party storage service to initiate requests without requiring that a client-side device maintain an open port that could potentially weaken a firewall and increase client exposure to outside threats). Additionally, in some examples these systems and methods may authenticate requests to retrieve client-side encryption keys to avoid unauthorized access to client-side encryption keys.

In one example, to prevent opening a firewall at a customer site, a customer key store may open an out-going long-poll connection to a connection tier at a cloud storage provider. The long-poll connection may time out, in which case the key store may immediate reestablish the long-poll connection. A connection server in the connection tier that receives the long-poll connection may create and monitor a private queue. Upon receiving a long-poll request from a key store, the connection tier may create a queue for that key store if the queue does not yet exist. The queue for the key store may be dedicated to outgoing messages from the connection tier to the key store. Such queues may support the scalability of the connection tier.

When a user request from a client arrives to a client-facing tier of the cloud storage provider, the client-serving tier may make a blocking call to the connection tier for a user key from the key store associated with the user. A connection server may receive the request and check for an outstanding long poll request from the matching key store. If an outstanding long poll request is found, the connection server may reply to the key store with a message that identifies the user (and that identifies the private queue of the connection server). If no outstanding long poll request from the matching key store is found, the connection server may place the message into a key store queue and the corresponding connection server may retrieve the message and provide it in response to the outstanding long poll request.

The key store may then retrieve the requested key and send a POST request to the connection tier. The POST request may include an identifier of the connection server and/or the private queue of the connection server that received the earlier blocking call. The connection server that receives the POST request may then place the key in the queue of the connection server that received the earlier blocking call. The connection server that received the earlier blocking call may provide the key in response to the earlier blocking call.

In one example, each request from the client (excepting the first request from the client) may contain an old authentication token that is difficult to spoof because it contains an encrypted part where the encryption was performed by a provider key that is stored in a separate environment. The authentication token may have been generated during a login flow using the user's credentials and never stored on the backend, but only provided in client requests. The connection server may validate the old authentication token to ensure that it came from the client. For a new client login (including a web-based login), a temporary token may be generated and used to validate the request. In another example, a two-factor authentication such as a SYMANTEC VIP token may be leveraged by adding the token value (or a hash of the token value) to a return redirect call to the provider. The provider may then include the token in the key request to give the corporate client infrastructure an opportunity to validate it.

Figure 6:
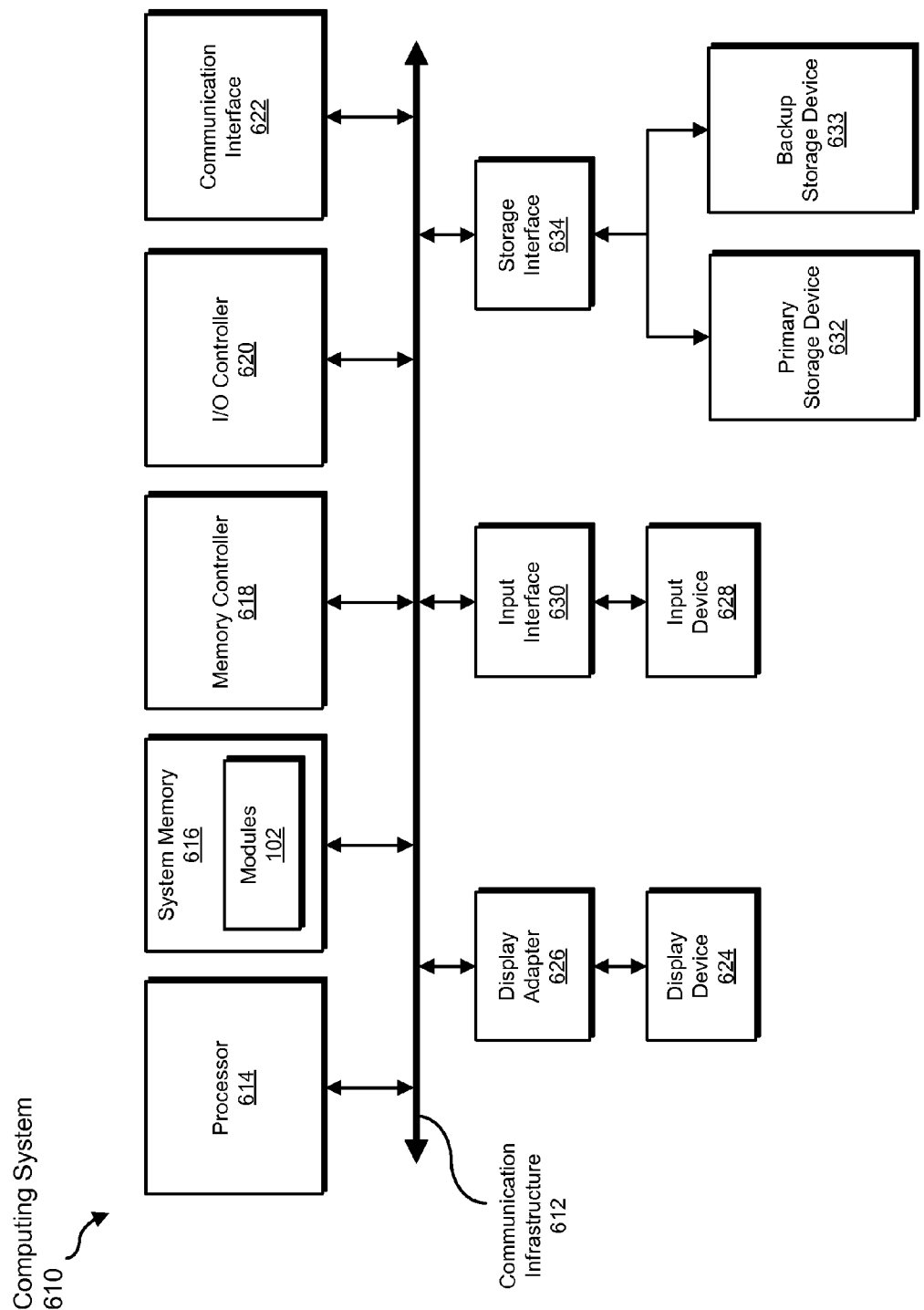
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for secure third-party data storage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a long poll request, transform the request into a decryption key, output the decryption key to a cloud storage service, use the decryption key to access cloud-stored data for the owner of the decryption key, and store the cloud-stored data on a computing device controlled by the owner of the decryption key. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for secure third-party data storage,
    at least a portion of the method being performed by a computing device comprising at least one processor, the method comprising:
    receiving, at a server-side computing system, a long poll request from a client system;
    identifying, at the server-side computing system, a data access request from the client system to access an encrypted file stored under a user account, wherein the requested access requires decryption of the encrypted file, wherein the data access request is subsequent to the long poll request;
    identifying, in reaction to the data access request, an asymmetric key pair designated for the user account, the asymmetric key pair comprising an encryption key and a decryption key that has been encrypted with a client-side key;
    responding to the long poll request, in reaction to the data access request, with a message notifying the client system to transmit the client-side key;
    receiving, from the client system, the client-side key;

decrypting the decryption key with the client-side key; and
using the decryption key to access an unencrypted version
of the encrypted file.

2. The computer-implemented method of claim 1, further comprising receiving a prior long poll request from the client system that times out before receiving the long poll request from the client system, wherein the client system sends the long poll request in response to determining that the prior long poll request has timed out.

3. The computer-implemented method of claim 1, wherein:
receiving the long poll request from the client system comprises receiving the long poll request at an intermediate application tier that is configured to receive the client-side key from the client system and to provide the client-side key to a data-serving application tier that accesses the unencrypted version of the encrypted file;
decrypting the decryption key with the client-side key comprises decrypting the decryption key at the data-serving application tier.

4. The computer-implemented method of claim 3, wherein identifying the data access request comprises receiving the data access request at the data-serving application tier.

5. The computer-implemented method of claim 4, wherein the data-serving application tier, in response to receiving the data access request, performs a synchronous call to the intermediate application tier that requests the client-side key.

6. The computer-implemented method of claim 3, wherein the intermediate application tier, upon receiving a synchronous call from the data-serving application tier that requests the client-side key, checks for an active long poll connection established by the long poll request.

7. The computer-implemented method of claim 3, wherein:
the intermediate application tier, upon receiving a synchronous call from the data-serving application tier that requests the client-side key, determines that no active long poll connection for requesting the client-side key is available;
in response to determining that no active long poll connection for requesting the client-side key is available, the intermediate application tier places the synchronous call in a request queue until an active long poll connection is established via the long poll request.

8. The computer-implemented method of claim 3, wherein:
a first server within the intermediate application tier receives a synchronous call from the data-serving application tier requesting the client-side key;
a second server within the intermediate application tier receives the client-side key from the client system;
the second server places the client-side key in a return queue;
the first server retrieves the client-side key from the return queue.

9. The computer-implemented method of claim 3, wherein:
the intermediate application tier receives an authentication token derived at least in part from user credential information used for access to the data-serving application tier;
the intermediate application tier responds with the message notifying the client system to transmit the client-side key in response to determining that the authentication token is valid.

10. A system for secure third-party data storage, the system comprising:
a connection module that receives, at a server-side computing system, a long poll request from a client system;
an identification module that identifies, at the server-side computing system, a data access request from the client system to access an encrypted file stored under a user account, wherein the requested access requires decryption of the encrypted file, wherein the data access request is subsequent to the long poll request;
a key module that identifies, in reaction to the data access request, an asymmetric key pair designated for the user account, the asymmetric key pair comprising an encryption key and a decryption key that has been encrypted with a client-side key;
a response module that responds to the long poll request, in reaction to the data access request, with a message notifying the client system to transmit the client-side key;
a receiving module that receives, from the client system, the client-side key;
a decryption module that decrypts the decryption key with the client-side key;
an access module that uses the decryption key to access an unencrypted version of the encrypted file;
at least one hardware processor configured to execute the identification module, the connection module, the key module, the response module, the receiving module, the decryption module, and the access module.

11. The system of claim 10, wherein:
the receiving module further receives a prior long poll request from the client system that times out before receiving the long poll request from the client system;
the client system sends the long poll request in response to determining that the prior long poll request has timed out.

12. The system of claim 10, wherein:
the receiving module receives the long poll request from the client system by receiving the long poll request at an intermediate application tier that is configured to receive the client-side key from the client system and to provide the client-side key to a data-serving application tier that accesses the unencrypted version of the encrypted file;
the decryption module decrypts the decryption key with the client-side key by decrypting the decryption key at the data-serving application tier.

13. The system of claim 12, wherein the identification module identifies the data access request by receiving the data access request at the data-serving application tier.

14. The system of claim 13, wherein the data-serving application tier, in response to receiving the data access request, performs a synchronous call to the intermediate application tier that requests the client-side key.

15. The system of claim 12, wherein the intermediate application tier, upon receiving a synchronous call from the data-serving application tier that requests the client-side key, checks for an active long poll connection established by the long poll request.

16. The system of claim 12, wherein:
the intermediate application tier, upon receiving a synchronous call from the data-serving application tier that requests the client-side key, determines that no active long poll connection for requesting the client-side key is available;
in response to determining that no active long poll connection for requesting the client-side key is available, the intermediate application tier places the synchronous call in a request queue until an active long poll connection is established via the long poll request.

17. The system of claim 12, wherein:
a first server within the intermediate application tier receives a synchronous call from the data-serving application tier requesting the client-side key;

a second server within the intermediate application tier receives the client-side key from the client system;

the second server places the client-side key in a return queue;

the first server retrieves the client-side key from the return queue.

18. The system of claim 12, wherein:

the intermediate application tier receives an authentication token derived at least in part from user credential information used for access to the data-serving application tier;

the intermediate application tier responds with the message notifying the client system to transmit the client-side key in response to determining that the authentication token is valid.

19. A non-transitory computer-readable-storage medium comprising one or more computer-readable instructions that, when executed by at least one processor of a computing device, cause the computing device to:

receive, at a server-side computing system, a long poll request from a client system;

identify, at the server-side computing system, a data access request from the client system to access an encrypted file stored under a user account, wherein the requested access requires decryption of the encrypted file, wherein the data access request is subsequent to the long poll request;

identify, in reaction to the data access request, an asymmetric key pair designated for the user account, the asymmetric key pair comprising an encryption key and a decryption key that has been encrypted with a client-side key;

respond to the long poll request, in reaction to the data access request, with a message notifying the client system to transmit the client-side key;

receive, from the client system, the client-side key;

decrypt the decryption key with the client-side key;

use the decryption key to access an unencrypted version of the encrypted file.

20. The non-transitory computer-readable-storage medium of claim 19, wherein:

the one or more computer-readable instructions cause the computing device to receive a prior long poll request from the client system that times out before receiving the long poll request from the client system;

the client system sends the long poll request in response to determining that the prior long poll request has timed out.

* * * * *